June 5, 1923.
W. A. STRAWMYER ET AL
1,457,863
DEVICE TO CONTROL THE TEMPERATURE OF STORAGE BATTERIES IN AUTOMOBILES
Filed Nov. 4, 1920    2 Sheets-Sheet 2
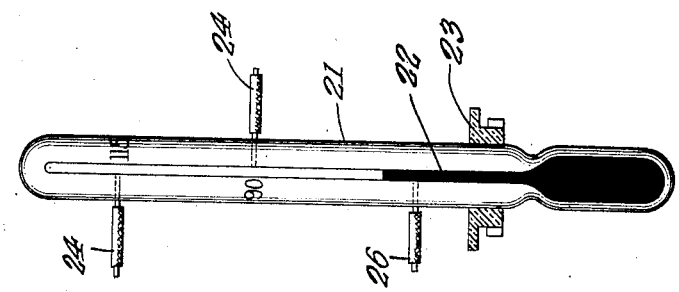
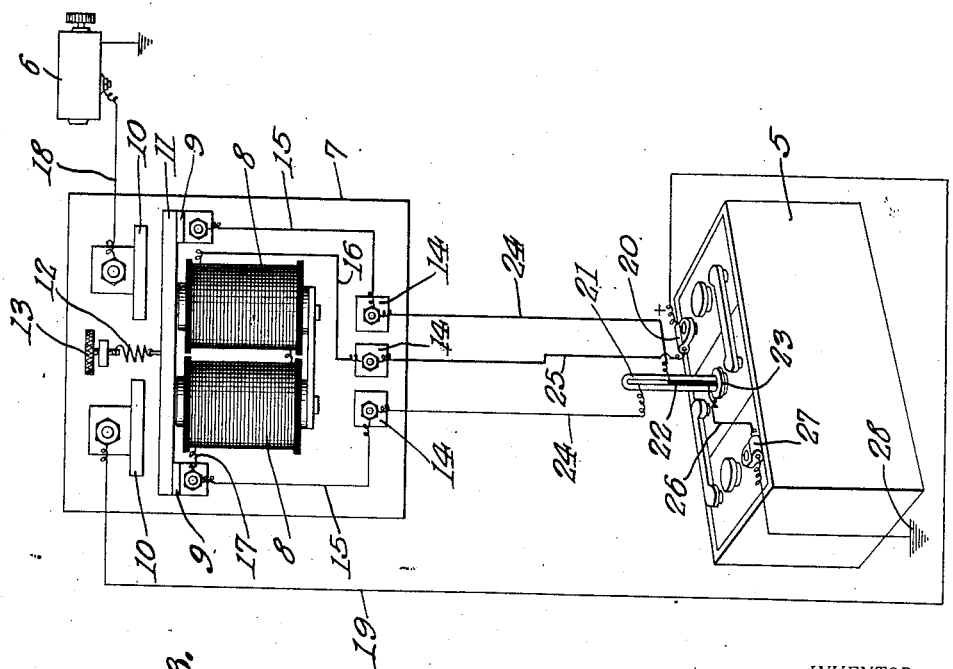
INVENTOR.
William A. Strawmyer
and Vane Beaman
ATTORNEY.

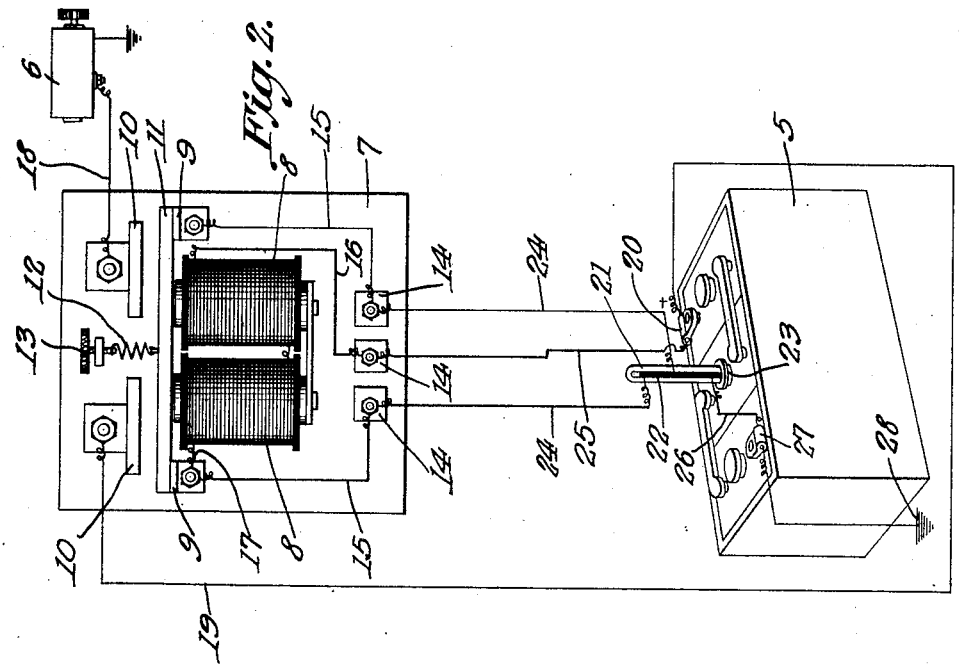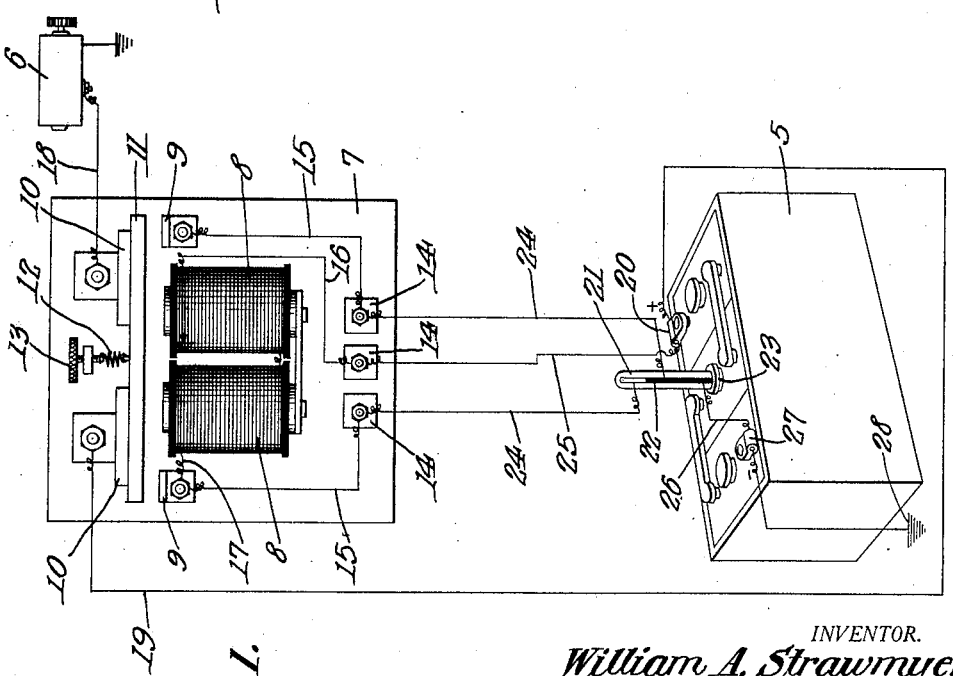

Patented June 5, 1923.

UNITED STATES PATENT OFFICE.

WILLIAM A. STRAWMYER AND VANE BEAMAN, OF ATLANTA, GEORGIA.

DEVICE TO CONTROL THE TEMPERATURE OF STORAGE BATTERIES IN AUTOMOBILES.

Application filed November 4, 1920. Serial No. 421,800.

*To all whom it may concern:*

Be it known that we, WILLIAM A. STRAW-MYER and VANE BEAMAN, citizens of the United States, residing at Atlanta, in the county of Fulton and State of Georgia, have invented a certain new and useful Device to Control the Temperature of Storage Batteries in Automobiles, of which the following is a specification.

Our invention relates to storage batteries particularly adapted to automobiles and other self-propelled vehicles.

In the modern automobile, it is usual to employ an electric generator to re-charge the storage battery, the result being, the storage battery is often over-charged, which causes a deterioration in the battery plates due to high temperatures. Our invention provides a device which when the battery reaches a predetermined high temperature, automatically breaks circuit between the generator and battery for a sufficient period of time to permit the battery to cool to a normal temperature, then automatically closes the circuit to permit the battery to again be charged.

Further, the invention provides a thermally controlled circuit breaker that can be associated with any type of storage battery, employing a liquid chemical agent.

Still another important object of the invention is to provide an electrically and thermally operated circuit breaker which obtains its electric energy from the battery with which the circuit closer is employed.

With the preceding and other objects that will become apparent from the following description, the invention consists in the construction and arrangement or combination of elements, to be fully set forth, claimed, and illustrated in the accompanying drawings wherein—

Figure 1 is a view partly in perspective and partly in elevation of the invention and its wiring diagram.

Figure 2 is a similar view showing the parts in operated position.

Figure 3 is a view similar to Figure 2 showing the expansible fluid receding to its normal position.

Figure 4 is a detail view of the thermally operated circuit closer embodied in the invention.

Referring in detail to the drawings, the numeral 5 designates the usual storage battery in its entirety, while 6 indicates a conventional electric generator employed to recharge the battery 5. The battery and generator are shown to illustrate the application of our invention which consists of a base 7, upon which an electro-magnet 8 is mounted. A pair of stationary contacts 9 are mounted upon the base 7 upon opposite sides of the coils 8. Also mounted upon the base 7 above the contacts 9 is a second pair of stationary contacts 10. An armature 11 extends transversely across the base 7 and is disposed between the contacts 9 and 10 and is adapted at times to engage each pair of contacts. The armature 11 is normally drawn towards the contacts 10 by a contractile spring 12 having one end fixed thereto and its opposite end secured to a tension regulating screw 13. A plurality of binding posts 14 are mounted upon the base 7 below the coils 8, two of which are electrically connected to the contacts 9 by conductors 15, while the other binding post is electrically connected to one of the coils by a conductor 16, the other coil being electrically connected to one of the contacts 9 as indicated at 17.

A conductor 18 leads from the generator 6 to one of the fixed contacts 10, while a conductor 19 leads from the other contact 10 to a clamp 20, electrically connected with the positive terminal of the battery 5. As illustrated in Figure 1 the armature 11 is normally engaged with the contacts 10 to establish electrical connection between the generator 6 and the battery 5 to recharge the latter.

A tube 21 containing thermally expanding liquid such as mercury 22 and provided with graduations 90 and 115 degrees is supported in the cap 23 of one of the cells (preferably the intermediate one) and has its lower end submerged in the chemical liquid in the cell.

Conductors 24 lead from the contacts 14 connected with the conductors 15 to the tube 21 and have their ends extending through the tube at points coinciding with the marks 90 degrees and 115 degrees respectively, and arranged to establish electrical communication between the conductors 24 and the battery 5, the latter being electrically connected at its positive terminal with a conductor 25 which leads to the central stationary contact 14. A relatively short conductor 26 leads from the tube 21 adjacent its lower end to the clamp 27, at the negative pole of the battery, this terminal being grounded as at 28. Assuming parts to be in position as shown in Fig. 1, the operation of the device is as follows:

Should a battery become over-charged, the liquid contents of the same would become heated to such a degree as to cause the expansible element 22 to rise in the tube 21. It follows that should the degree of heat be sufficient to cause the expansible element to rise to a point 115 degrees, an electric circuit would be completed from the battery 5 to the coils 8 which draws the armature into engagement with the stationary contacts 9 breaking the circuit from the generator 6 to the battery 5. After the battery 5 has cooled sufficiently, to cause the liquid element 22 to recede to the position shown in Fig. 3 the circuit would still be completed to the coils to hold the armature away from the contacts 10. Upon the liquid element receding below the 90 degree point, the circuit from the battery to the coils would become broken, allowing the armature, under the influence of the spring 12 to engage the contacts 10 to complete the circuit from the generator to the battery to permit the same to again be recharged.

While the construction shown and described is a practical embodiment of the invention, it will be stated that the same may be modified and that our limits of such modification are governed by what is claimed.

We claim—

In a device for controlling the temperature of a storage battery, the combination with the storage battery and a generator electrically connected for charging the storage battery, of a circuit breaker in the circuit which connects the generator with the storage battery, said circuit breaker including an armature and an electro-magnet, a pair of normally disconnected contacts in position to be electrically connected by said armature and said electro-magnet the armature being adapted to break the circuit between the generator and storage battery, a thermostat extending through the top of the storage battery from the interior to the exterior and including an upper and a lower and an intermediate electric contact, said thermostat also including an expansible element which is constantly in electric connection with the said lower and being movable into and out of electric connection with the said intermediate and upper electric contacts, an electric conductor connecting one of said normally disconnected contacts with the said intermediate contact, an electric conductor connecting the other one of normally disconnected contacts with the said upper contact of the thermostat, a conductor connecting one terminal of said electro-magnet to one of said normally disconnected contacts, and a conductor connecting the other terminal of said electro-magnet with said storage battery, means being provided to automatically move the said armature away from said normally disconnected contacts into the position for closing the charging circuit between the said generator and storage battery, for the purpose specified.

In testimony whereof we affix our signatures.

WILLIAM A. STRAWMYER.
VANE BEAMAN.